United States Patent

Hutchinson et al.

[15] 3,703,935
[45] Nov. 28, 1972

[54] WEIGHING SCALE WITH CONCEALABLE DIAL

[72] Inventors: William Y. Hutchinson, Chicago; Walter P. Kushmuk, Niles, both of Ill.

[73] Assignee: Continental Scale Corporation, Chicago, Ill.

[22] Filed: Dec. 28, 1970

[21] Appl. No.: 101,877

[52] U.S. Cl. .....................177/124, 177/180, 116/98
[51] Int. Cl. ............................................G01g 23/02
[58] Field of Search........177/63, 124, 125, 127, 135, 177/177, 180, 181, 241, 264; 116/98

[56] References Cited

UNITED STATES PATENTS 1,171,912  2/1916  Williams et al. ........177/157 X
1,465,252  8/1923  Craig.....................177/164 X
2,791,417  5/1957  Daroff..................177/245 X Primary Examiner—Richard B. Wilkinson
Assistant Examiner—George H. Miller, Jr.
Attorney—Johnston, Root, O'Keeffe, Keil, Thompson & Shurtleff

[57] ABSTRACT

A weighing scale is provided of the type having a weight indicating dial adjacent the weighing platform wherein a cover for said dial is mounted adjacent the dial and is adapted to open and close so that the dial will be exposed to view when the cover is open and covered when the cover is closed, the opening of the cover being actuated automatically in response to weight being applied to the platform.

11 Claims, 13 Drawing Figures

PATENTED NOV 28 1972

INVENTORS:
WILLIAM Y. HUTCHINSON
WALTER P. KUSHMUK

BY: Johnston, Root, O'Keeffe, Keil, Thompson & Shurtleff

ATT'YS

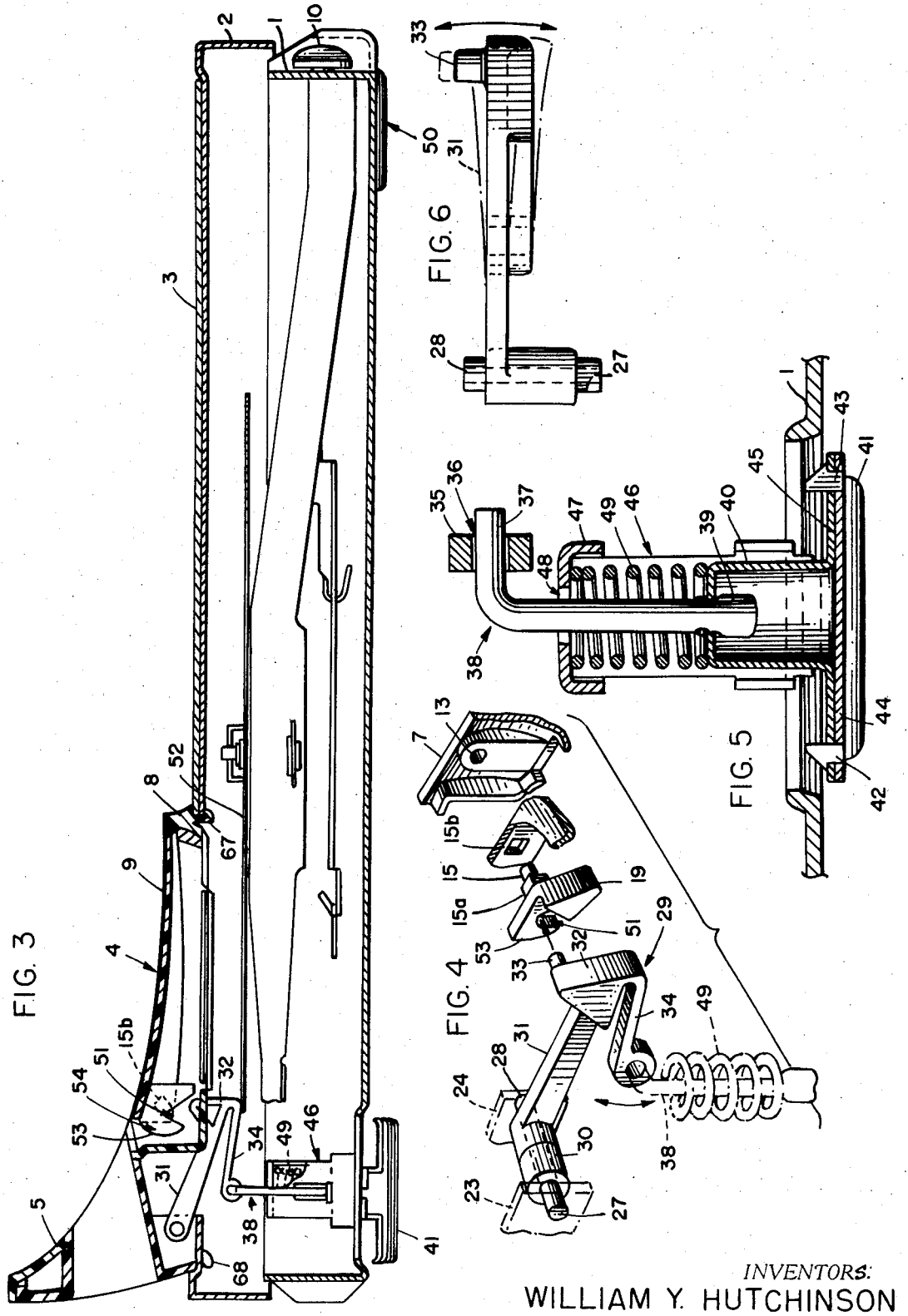

PATENTED NOV 28 1972

INVENTORS:
WILLIAM Y. HUTCHINSON
WALTER P. KUSHMUK

BY: *Johnston, Root, O'Keeffe, Keil, Thompson & Shurtleff*
ATT'YS

PATENTED NOV 28 1972
3,703,935
SHEET 4 OF 4
FIG. 10
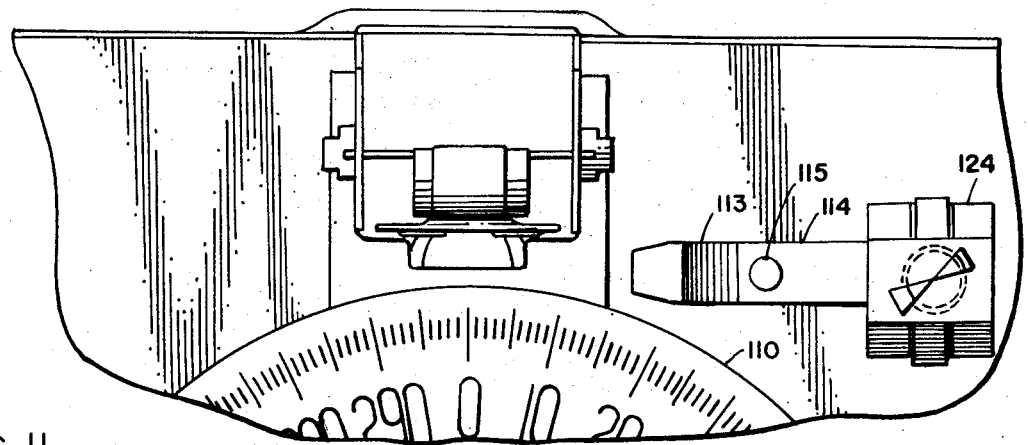
FIG. 11
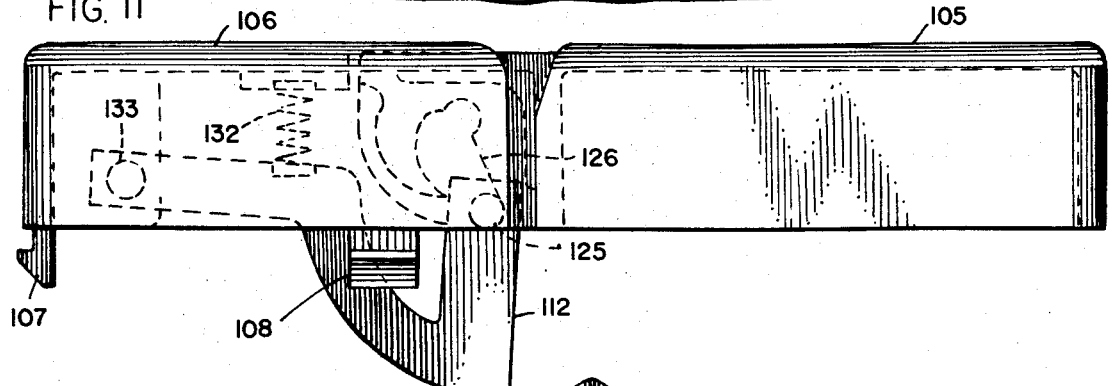
FIG. 12
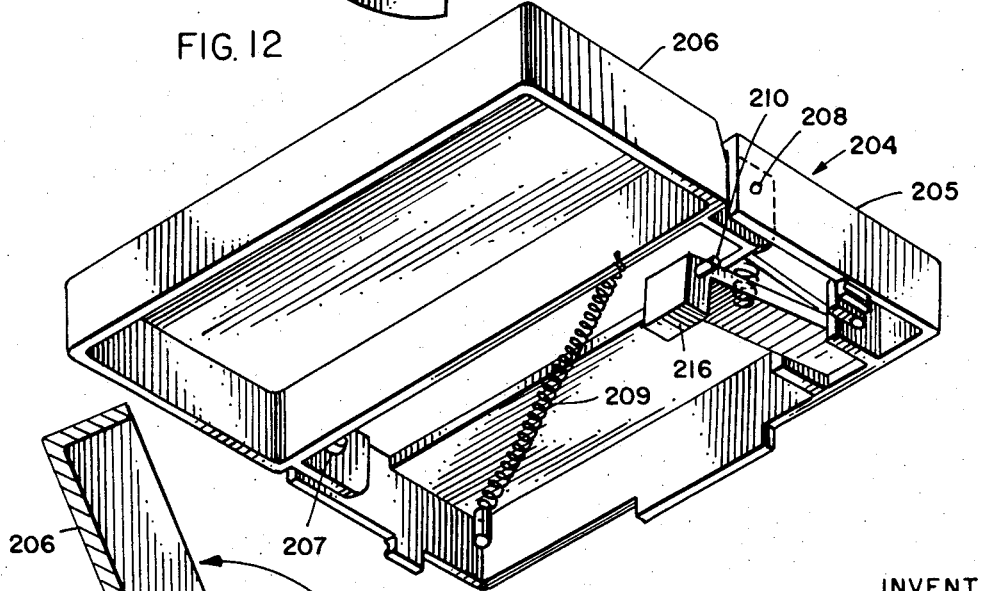
FIG. 13
INVENTORS:
WILLIAM Y. HUTCHINSON
WALTER P. KUSHMUK
BY: Johnston, Root, O'Keeffe,
Keil, Thompson & Shurtleff
ATT'YS

WEIGHING SCALE WITH CONCEALABLE DIAL

BACKGROUND OF THE INVENTION

As is well known, there are many different types of weighing scales having a weighing platform mounted on a base and a weight indicating dial adjacent said platform. In many of these scales, the weight indicating dial is mounted beneath the scale platform on which the user stands and is visible through an opening in the platform covered by a transparent lens. Such scales are commonly used in bathrooms and other parts of domestic households where the transparent lens over the dial is exposed to dust, dirt and water which sometimes make it difficult to read the dial and necessitate cleaning of the dial lens from time to time.

It would be desirable to provide a scale of the type described in which the dial and/or its associated lens are covered in such a way as to prevent contamination by dust, dirt and moisture. It is also desirable to provide a scale having a dial cover in which the cover is actuated into open position automatically in response to weight applied to the scale platform and in which the cover is actuated to a closed position automatically when a weight which has previously been applied to the scale platform is removed.

OBJECTS

It is an object of the present invention to provide a new and improved weighing scale of the type in which a weight indicating dial is mounted adjacent the weighing platform characterized by the feature that a cover for said dial is mounted adjacent said dial and is adapted to open and close to expose the dial to view and hide it from view automatically in response to the application and removal of a weight from the scale platform.

A further object of the invention is to provide a scale cover mechanism for the dial in which the cover can be opened manually and wherein automatic operation is restored without adjustment by the user.

Still a further object of the invention is to provide a weighing scale of the type described having a cover for the dial which opens and closes automatically in response to the application and removal of weight from the weighing platform and which contains an overload mechanism to prevent damage to the actuating means and the cover when the cover is held in closed position while a weight is applied to the weighing platform.

An additional object of the invention is to provide a new and improved weighing scale of the type described in which the cover for the dial is mounted in a superstructure which also contains a handhold for carrying the scale.

BRIEF DESCRIPTION OF THE DRAWINGS

Other objects and advantages of the invention will appear from the following description in conjunction with the accompanying drawings in which

FIG. 3 is a sectional view taken longitudinally through the central part of FIG. 1;

FIG. 4 is an exploded view of parts of the cover actuating mechanism shown in FIGS. 2 and 3;

FIG. 5 is a sectional view of another part of the cover actuating mechanism shown in FIG. 3;

FIG. 6 is an enlarged top plan view of one of the elements of FIGS. 2, 3 and 4;

FIG. 10 is a plan view with the cover superstructure removed of a portion of the scale shown in FIGS. 7, 8 and 9;

FIG. 11 is a side view of the cover, cover supporting means and a portion of the cover actuating means of the embodiment illustrated in FIGS. 7, 8 and 9;

FIG. 12 is a perspective view illustrating another embodiment of the invention generally similar to the embodiment shown in FIGS. 7 to 11, but differing in the actuating mechanism for opening and closing the cover; and FIG. 13 is a partial sectional view of the cover mechanism shown in FIG. 12 in which the cover is in open position.

BRIEF SUMMARY OF THE INVENTION

Figures 1, 2:
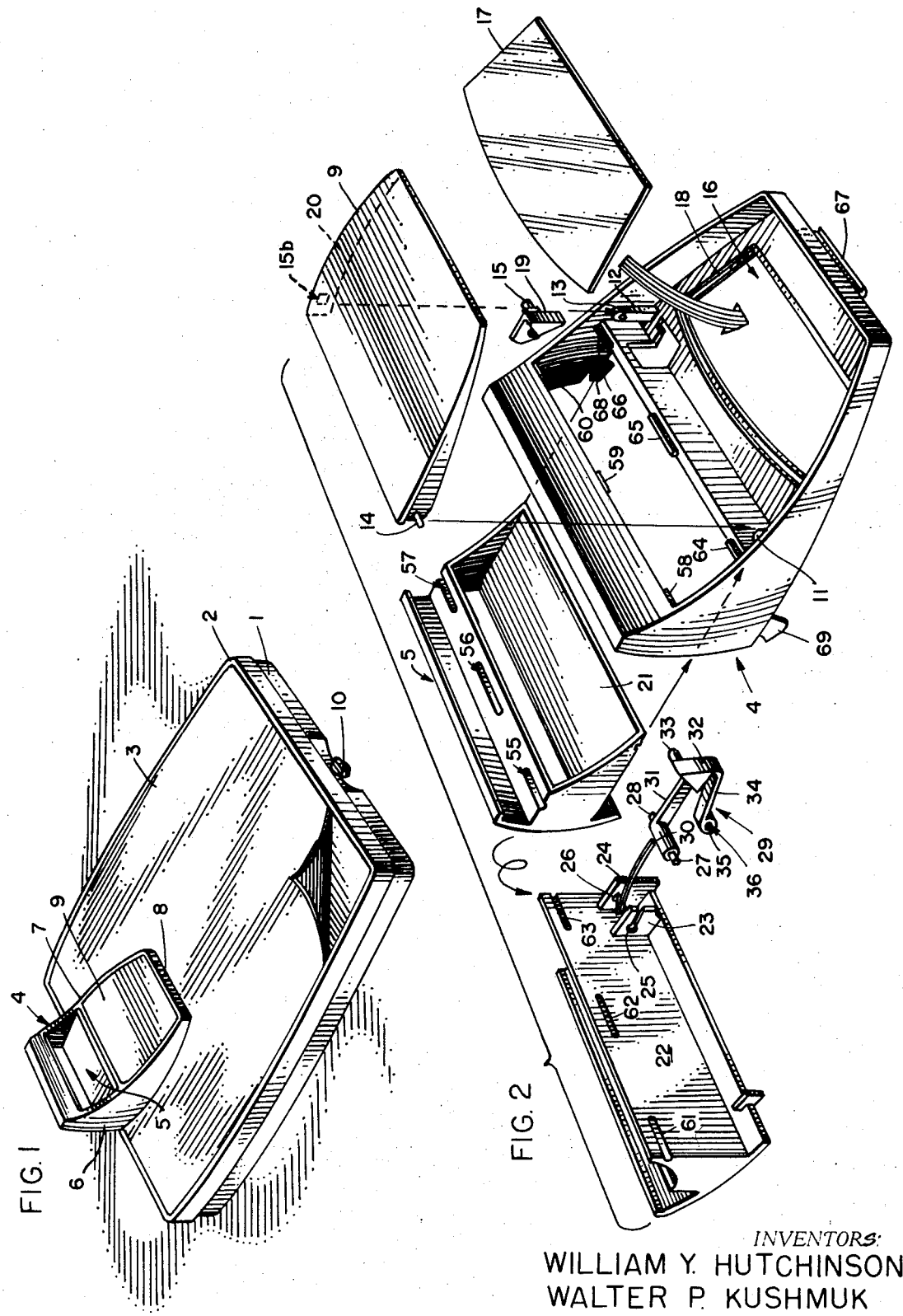
FIG. 1 is a perspective view illustrating one embodiment of the invention.
FIG. 2 is an exploded view of the superstructure mounted on the weighing platform of the sale shown in FIG. 1.

In accordance with the invention a weighing scale is provided comprising a base, a weighing platform mounted on said base, a weight indicating dial mounted adjacent said platform, a cover for said dial mounted adjacent said dial and adapted to open and close so that said dial is exposed to view when said cover is open and covered by said cover when said cover is closed, and an actuating means operative to open said cover automatically in response to weight applied to said platform and to close said cover automatically when a weight which has been previously applied to said platform has been removed. In addition, the invention provides a mechanism of the type described in which automatic operation of the cover is restored after the scale has been moved manually to its open position. The invention also provides an overload mechanism to prevent damage to the cover actuating means in case the cover is held in closed position while a weight is applied to the platform.

DETAILED DESCRIPTION OF THE INVENTION

In the embodiment of the invention illustrated in FIGS. 1 to 6, the weighing scale comprises a base 1, a platform 2, provided with a mat or other suitable covering 3, and a superstructure generally illustrated at 4. The superstructure 4 comprises a handle 5 which is preferably molded integrally with side members 6 and 7. A front member 8 is also molded integrally. A lid, top or cover 9 is pivotally supported from posts molded into or affixed to the sides 6 and 7. A zero scale adjustment is provided at 10.

As shown in FIG. 2, the interior of the superstructure 4 has two integrally molded posts 11 and 12 each having an inwardly extending recess 13 near the top thereof adapted to receive outwardly extending pivot pins 14 and 15. Pivot pin 14 is integrally molded on one side of cover 9. Pivot pin 15 is formed as hereinafter described. When said pivot pins 14 and 15 are mounted in the holes 13, the cover 9 can be raised and lowered by pivoting around the pins 14 and 15.

The bottom of superstructure 4 has an opening 16 through which the scale dial is normally visible when the cover 9 is raised. A transparent lens 17 is adapted to fit in a recess 18 extending around the sides of the opening 16.

A cam member 19 is mounted on the inner side of the downwardly depending portion 20 of cover 9 opposite opening 13. The cam member 19 has a square shank 15a which is adapted to fit into a square hole 15b in side member 20 of cover 9 thereby affixing cam 19 to cover 9. The outer portion of pin 15 projects through said hole 15b and is mounted for rotation in recess 13 of side 7 of superstructure 4.

Handhold member 5 is preferably molded in a single piece as shown in FIG. 2 and is adapted to fit telescopically into the outer end of superstructure 4. As shown in FIG. 2 the handhold member 5 has a flat bottom portion 21, on the underside of which 22 are integrally molded two members 23 and 24 having keyhole slots therein 25 and 26. The slots 25 and 26 are adapted to receive outwardly extending studs 27 and 28 of actuating mechanism 29. The pivotal portion 30 of actuating mechanism 29 is movable vertically as platform 2 moves in response to a weight placed on or removed from said platform and is connected by a first actuating lever 31 to a generally triangular cam pin supporting member 32 on which is mounted a cam pin 33. The first actuating lever 31 has sufficient depth so that it is rigid in a vertical direction but it is relatively narrow in width so that it is somewhat flexible in a horizontal direction.

A second actuating lever 34 is integrally molded with member 32 and has an enlarged portion 35 at one end with a hole 36 extending therethrough. The actuating lever 34 is relatively wide and therefore substantially rigid in a transverse direction but is relatively narrow and therefore somewhat flexible under unusual pressure in a vertical direction.

As shown in FIGS. 3, 4 and 5, the end 35 of actuating lever 34 is mounted on one end 37 of link 38 so that the sides of opening 36 act as a bearing permitting vertical movement. The other end 39 of link 38 is secured to plunger 40 which in turn is fastened to foot 41 by means of members 42 and 43. A washer 44 is interposed between foot 41 and the outwardly extending portions 45 of plunger 40. Link 38 and plunger 40 are mounted in a cartridge 46 with a top 47 secured thereto in any suitable manner and having an opening 48 therein to permit passage of the vertical portion of link 38. The lower part of the cartridge 46 is fixed or secured to the sides of an opening in base 1. Thus, the plunger 40 with its associated lever 38 is free to move up and down in the cartridge 46. However, it is normally biased in an outwardly direction by the coil spring 49 which is mounted around link 38 between the inside of the top 47 of cartridge 46 and the top of plunger 40.

The scale normally has four feet, one on each corner as generally illustrated at 50. When the scale is placed on a flat surface it will normally be supported at one end by the feet 50 nearest the user but at the other end the foot 41 will normally rest on the floor or other supporting surface and project below a plane through the feet at the corners of the base. The coil spring 49 must be sufficiently strong to maintain the foot 41 in this position when the scale is not in use but sufficiently weak to be overbalanced by a weight exceeding the scale platform weight.

When the user steps on the platform the foot 41 will move upwardly causing the link 38 to move upwardly against the pressure of spring 49 thereby causing the arm 34 of the actuating lever 29 and the arm 31 to move upwardly whereby the cam pin 33 presses against the lower side of cam member 19 camming the latter upwardly along with the lid or cover 9 until the cam pin 33 slides into recess 51 (FIG. 4) at which point the lid or cover 9 is fully open, thereby exposing the dial 52 (FIG. 3) beneath the lens 17. Hence, each time anyone steps on the platform of the scale the cover or lid 9 will flip open and the dial 52 will be exposed. As soon as such person steps off of the scale the spring 49 will cause link 38 to pull the actuating lever 29 downwardly and the cam pin 33 will slide out of the recess 51 causing the cover 9 to restore to its normally closed position shown in FIG. 3.

Sometimes the user of the scale may wish to raise the cover 9 manually, for example, in order to adjust the zero setting of the dial. If the cover 9 is allowed to remain open and the user steps on the scale, then the actuating lever mechanism 29 will cause the cam pin 33 to move upwardly and impinge against the portion 53 of cam member 19. The portion 53 of cam member 19 is tapered in the area 54 causing the cam pin 33 to be cammed laterally until it pops over the inner edge of the recess 51 and is seated in said recess 51. This is made possible by the lateral flexibility of the arm 31 as shown in FIG. 6. As soon as the cam pin 33 is seated in recess 51 the normal operation of the cover 9 is restored and the cover is pulled downwardly when the user steps off the scale.

If, for any reason, someone holds the cover closed and steps on the scale the overload on actuating member 29 is taken up by vertical movement of member 34 which is normally sufficiently rigid to permit normal actuation of the cover 9 but is flexible in a vertical direction in the event of an overload.

Referring to FIG. 2 it will be noted that the handhold member 5 is provided with recesses 55, 56 and 57, the sides of which are adapted to interlock with projections 58, 59 and 60 when member 5 is inserted in member 4. Also, there are recesses 61, 62 and 63 on the underside of the bottom portion 21 of member 5 which are adapted to interlock with projections 64, 65 and 66.

The superstructure 4 has a depending portion 67 with a recess therein adapted to snap against the side of an opening in the top of base 2 and two other recessed depending portions 68 and 69 adapted to snap against the opposite side of said opening in base 2 when said superstructure is pressed downwardly.

Figure 7:
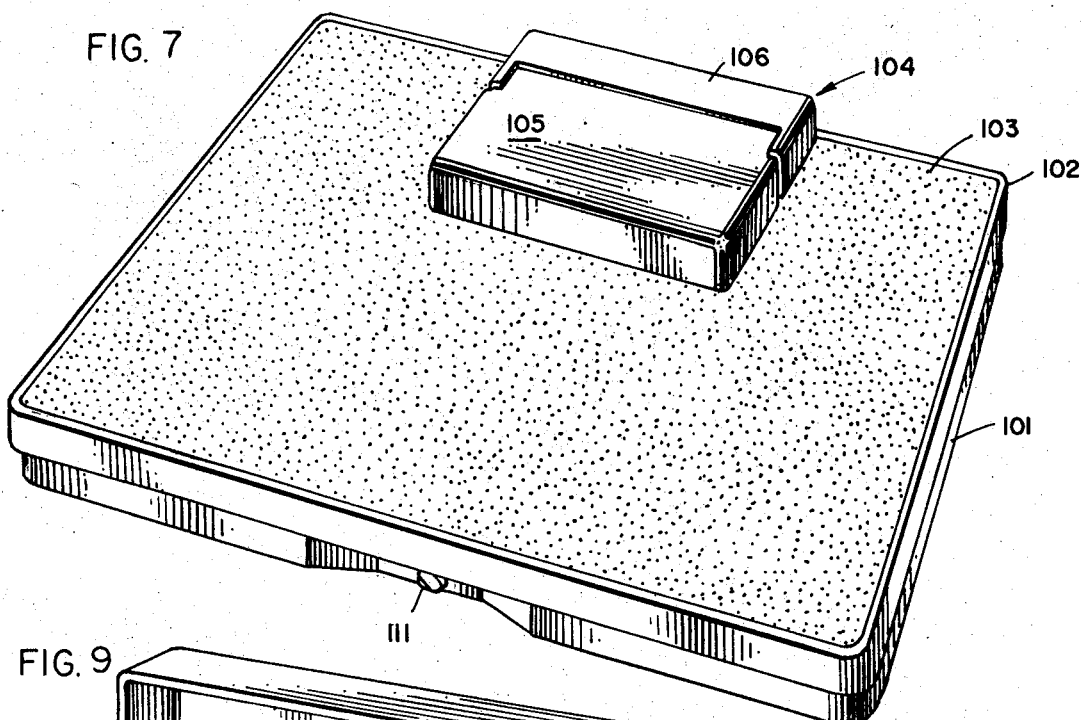
FIG. 7 is a perspective view of a weighing scale illustrating another embodiment of the invention.
Figure 8:
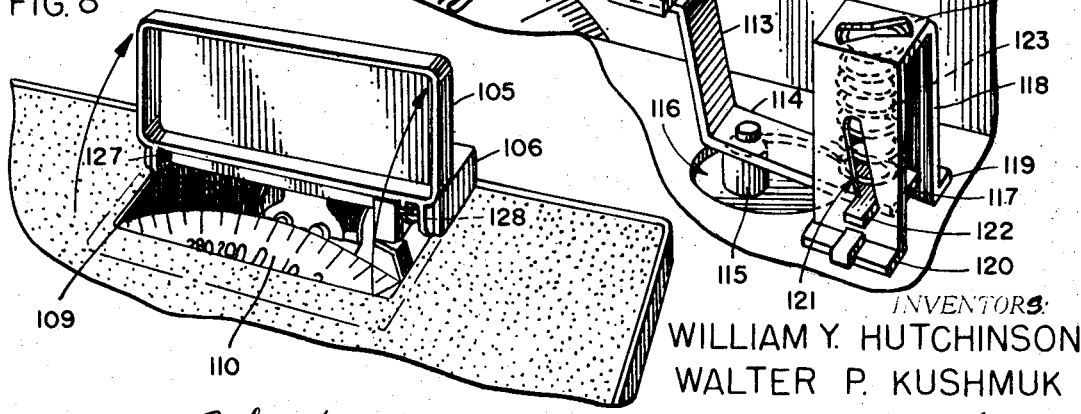
FIG. 8 is a perspective view of a portion of the weighing scale shown in FIG. 7 with the cover for the dial in open position.

In the embodiment of the invention illustrated in FIGS. 7 to 10, the weighing scale comprises a base 101, a platform 102, provided with a mat or other suitable covering 103 and a superstructure generally illustrated at 104. Superstructure 104 comprises a cover member 105 and a cover supporting member 106. The cover supporting member 106 is secured to the sides of an opening in platform 102 in any suitable manner. The component parts of the superstructure 104 are preferably molded from a synthetic resin and downwardly extending tabs in member 106 are provided as shown at 107 and 108 in FIG. 11. A tab similar to 108 is provided on the opposite side. These tabs are somewhat flexible so that when the supporting member 106 is pressed downwardly the tabs 107 and 108 will snap into place beneath the sides of opening 109 in platform 102. Opening 109 permits the scale dial 110 to be exposed to view when cover 105 is open as shown in FIG. 8. A zero scale adjustment is provided at 111.

When the weighing scale is not being used, the cover 105 is normally closed as shown in FIG. 7. When a person steps on the scale the platform 102 is pressed downwardly, thereby causing arm 112 to move upwardly due to pressure from arm 113. Arm 113 has a transversely extending portion 114 which is affixed to a foot 115 adapted to rest on the floor supporting the scale. As shown, the foot 115 extends through an opening 116 in the base 101. The end portion 117 is mounted in a cartridge 118 and the cartridge 118 is affixed to the base 101 by interlocking metal tabs or in any suitable manner at 119 and 120. Cartridge 118 contains an upwardly slanting slot 121 adapted to receive a projecting portion 122. A coil spring 123 is inserted between the top 124 of cartridge 118 and the top of end 117.

Figure 9:
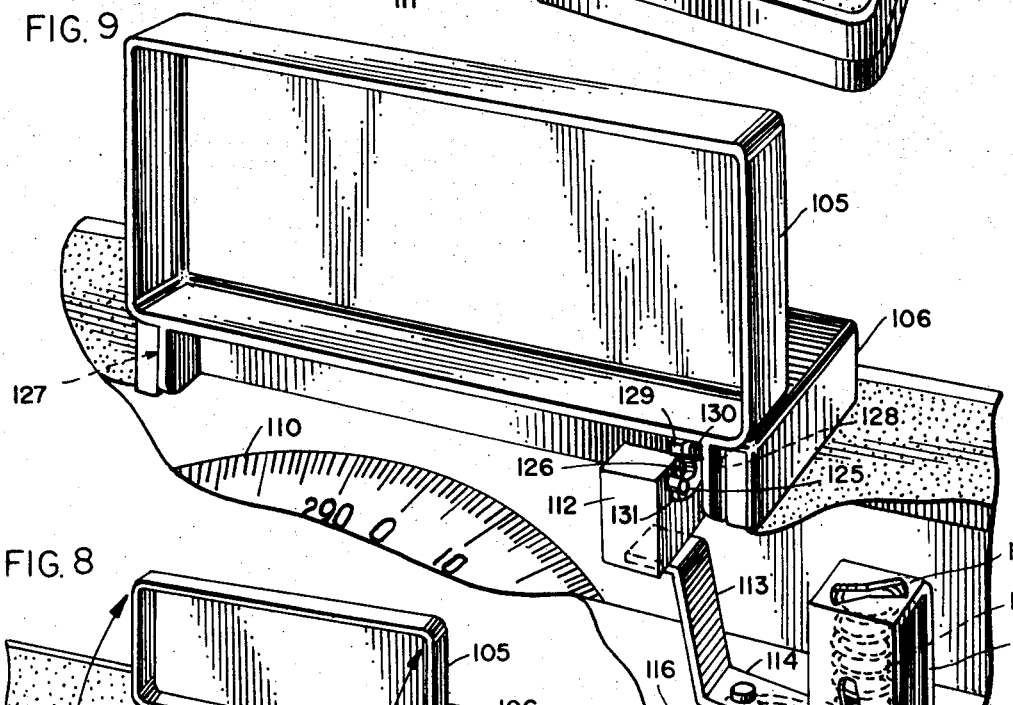
FIG. 9 is an enlarged perspective view with parts broken away illustrating more details of the operating mechanism of the embodiment shown in FIGS. 7 and 8.

In normal operation, when a user applies weight to platform 102, as arm 112 is forced upward, cam pin 125 moves in cam track 126 thereby causing cover 105 to pivot around pins 127 and 128 and assume the open position shown in FIGS. 8 and 9. The cam track 126 is formed in member 129 which is slidable transversely against the pressure of spring 130 for a limited distance while maintaining a fixed relative position with respect to cover 105. If cover 105 is opened manually thereby causing the pin 125 to become disengaged from cam track 126, the proper engagement of pin 125 with cam track 126 is renewed by pin 125 pressing upwardly against an outer vertically tapered portion 131 of cam track member 129 thereby causing the member 129 to slide laterally to the right as viewed in FIG. 9 against the pressure of spring 130 until the pin 125 snaps into the cam track 126, whereupon the pressure of spring 130 returns cam track member 129 to the left into its normal position with pin 125 ready to engage cam track 126.

When the weight is removed from the platform 102 spring 132 causes arm 112 to move downwardly around pivot 133 thereby causing cam pin 125 to move along cam track 126 and close cover 105.

The foot 115 normally lifts the toe end of the scale off of the floor approximately one-quarter inch (about one-eighth inch at the center) when not in use. Application of a predetermined load (e.g., 10 pounds) to the platform causes the actuating mechanism to open the cover 105.

In the event that the cover 105 is held in a closed position by an exterior force and a weight is applied to the scale, the lever 114 will tilt around foot 115 causing projection 122 to rise in slot 121 against the pressure of spring 123 thereby relieving the overload and preventing damage to the cover lifting mechanism.

In another form of the invention as illustrated in FIGS. 12 and 13, the cover actuating mechanism is somewhat different. As shown, the superstructure generally indicated at 204 comprises a cover supporting mechanism 205 and a cover 206 which is pivotally supported from holes in one end of cover supporting mechanism 205 by pins 207 and 208. The pins 207 and 208 are long enough so that cover 206 is free to move sideways about one-eighth inch. Normally the overriding spring 209 which is fastened at one end to cover 206 and at the other to cover supporting mechanism 205 pulls cover 206 toward the left as viewed in FIG. 12. In this position, when the cover 206 is closed, cam pin 210, which is about three-sixteenths inch long, is ready to engage cam track 211 in cam track member 212 affixed to a portion of cover 206. Cam pin 210 extends laterally from actuating member 213 which is pivotted at 214 and normally pressed in a downward position by pressure exerted from coil spring 215. The end 216 of actuating lever 213 is normally in contact with the upper end of member 113. The remainder of the assembly is similar to that shown in FIGS. 9 and 10. Hence, when a weight is applied to the platform member 113 moves upwardly pressing against the portion 216 of actuating lever 213 thereby causing cam pin 210 to engage cam track 211 and move cover 206 to the open position shown in FIG. 13. Normally a seven thirty-seconds inch upward movement of actuating lever 213 will cause the cover 206 to move to a 65° open position. The over-center spring 209 then opens the cover to 110° full open position. Release of the applied force causes the spring 215 to return the actuating member 213 to its original position which operates the cover through a 65° motion to a 95° open position. The over-center spring 209 then returns the cover to its closed position.

In all of the previously described mechanisms the weighing mechanism is conventional and does not form a part of the invention. The cover and the superstructure in which it is mounted and the various parts thereof, including the actuating elements, are preferably molded from a synthetic resin or polymer. Examples of suitable materials of construction are high impact polystyrene, formaldehyde polymers (e.g., Delrin) and polycarbonates (e.g., Lexan).

The invention makes it possible to keep the dial cover of the scale free from dirt and moisture. At the same time, the cover mechanism is compact and durable.

It is apparent that some variations and modifications can be made in the structures described without departing from the invention.

The invention is hereby claimed as follows:

1. A weighing scale comprising a base, a weighing platform mounted on said base, a weight indicating dial mounted adjacent said platform, a cover for said dial mounted adjacent said dial and adapted to open and close so that said dial is exposed to view when said cover is open and covered by said cover when said cover is closed, and an actuating means operative to open said cover automatically in response to weight applied to said platform.

2. A weighing scale as claimed in claim 1 in which said actuating means is also operative to close said cover automatically when a weight which has been previously applied to said platform is removed.

3. A weighing scale as claimed in claim 1 in which said cover is pivotally mounted.

4. A weighing scale as claimed in claim 1 in which said cover can be moved manually to its open position to expose said dial, and said scale comprises means restoring automatic operation of said cover after it has been moved manually to its open position.

5. A weighing scale as claimed in claim 1 comprising an overload mechanism to prevent damage to said actuating means and said cover when said cover is held in closed position while a weight is applied to said platform.

6. A weighing scale as claimed in claim 1 in which said cover is mounted in a superstructure on said platform containing an opening exposing said dial.

7. A weighing scale as claimed in claim 6 in which said superstructure is mounted in an opening in said platform.

8. A weighing scale as claimed in claim 6 in which said superstructure also contains a handhold opening for lifting said scale.

9. A weighing scale as claimed in claim 6 in which said superstructure is molded from a synthetic polymer.

10. A weighing scale as claimed in claim 1 in which said actuating means comprises an actuating foot mounted in an opening in said base and normally supporting said scale when no weight is applied to said platform, said foot having a plunger mounted thereon, a cartridge mounted on said base having an open lower end receiving said plunger and an upper end which is closed except for an opening therein, a coil spring disposed within said cartridge between the upper end of said plunger and the upper end of said cartridge, a link connected at one end to the upper part of said plunger and passing through said opening in said upper end of said cartridge, a first lever connected at one end for vertical movement to the other end of said link, said lever being flexible vertically and rigid transversely, a cam pin supporting member fixed to the other end of said first lever, a cam pin extending outwardly from said cam pin supporting member, a second lever fixed at one end to said cam pin supporting member which is flexible transversely and rigid vertically, pivot means connected to the other end of said second lever and movable with said platform, and a cam member fixed to said cover having a cam track normally interfitting with said cam pin, whereby when a weight is placed on said platform said cover opens and when the weight is removed from said platform said cover closes.

11. A weighing scale as claimed in claim 10 in which said cam member has a tapered portion which cams said cam pin laterally and restores it to its normal position in the cam track when a weight is applied to the platform after the cover has been opened manually.

* * * * *